United States Patent [19]

Lee

[11] Patent Number: 4,500,596
[45] Date of Patent: Feb. 19, 1985

[54] POLYURETHANE FOAMED IN-SITU AGAINST SKIN TERPOLYMER COMPRISING ETHYLENE AND PROPYLENE

[76] Inventor: Jimmy D. Lee, 14914 Sellers Rd., Houston, Tex. 77060

[21] Appl. No.: 514,646

[22] Filed: Jul. 18, 1983

[51] Int. Cl.³ .............................................. B32B 27/40
[52] U.S. Cl. .................................. 428/317.5; 156/79; 428/318.4; 428/319.1; 428/319.9
[58] Field of Search ............. 428/317.5, 317.7, 319.9, 428/424.6, 424.7, 424.8, 314.4, 314.8, 318.4, 318.6, 319.1, 319.3, 319.7; 156/79; 264/46.4, 46.5

[56] References Cited

U.S. PATENT DOCUMENTS

| | | | |
|---|---|---|---|
| 2,999,041 | 9/1961 | Lappala | 428/319.3 |
| 3,507,730 | 4/1970 | Gambill et al. | 428/442 |
| 3,616,171 | 10/1971 | Hoskinson, Sr. | 428/319.7 |
| 4,162,597 | 7/1979 | Kelly | 52/410 |
| 4,214,034 | 7/1980 | Kodera et al. | 428/319.9 |

Primary Examiner—William J. Van Balen
Attorney, Agent, or Firm—Kenneth H. Johnson

[57] ABSTRACT

Laminate compositions composed of polyurethane between and bonded to a substrate and a membrane of polyethylene, polypropylene or copolymer of ethylene and propylene modified to adhere to polyurethane for use as an insitu construction material. For example, chlorinated polyethylene, chlorosulfonated polyethylene or ethylene propylene diene monomer 20 to 50 mil film bonded to a polyurethane which was foamed in place over a corrugated steel roof to form a water tight roof construction.

7 Claims, 3 Drawing Figures

POLYURETHANE FOAMED IN-SITU AGAINST SKIN TERPOLYMER COMPRISING ETHYLENE AND PROPYLENE

BACKGROUND OF THE INVENTION

1. Field of the Invention

The present invention relates to laminate compositions of polyurethane and specific polymeric membranes and a substrate. The present laminate compositions are useful in construction for forming in place waterproof coverings for walls and especially for roofs.

2. Related Art

Various polymeric membranes (i.e., films or sheets are now being widely used for the purpose of providing waterproof roofing cover, replacing to a large extent asphalt treated felt, particularly in commercial structures. These materials are currently put in place in three ways, i.e., loose, partially adhered and fully adhered.

The predominate system is loose-laid which is ballasted, for example, with stone. The stone may be held in place by coating the loose membrane with tar (asphaltic material) then applying the stones, just as felt has been held in place for years. This system is reputed by some members of the roofing industry to be the current best system, however, just as with the old felt roofs, the stones loosen and the asphalt degrades resulting in a leaky roof, whereas the polymer membrane is still intact. It should also be appreciated that the presence of the stones requires a relatively heavy membrane (e.g. 40 mils) to prevent punctures from the stones. A modification of this system is a mechanical ballast wherein, for example, strips of metal are laid over the membrane and affixed (e.g., by screws) to the roof substrate. Usually in these systems the seams would be lapped and solvent or adhesive bonded and lap point caulked. Such a system is described in U.S. Pat. No. 4,162,597.

The partially adhered systems presently used solvent adhesives which are applied along each edge of each membrane, lapped and caulked as for the ballasted systems. The fully adhered systems also use solvent adhesives applied over the entire area of the membrane between the membrane and roof substrate. This system avoids the ballast but is generally considered to be too costly in that the solvent adhesives are expensive, do not obtain a good adherence, contain flammable solvents and are more labor intensive. Primers should be used, which further increase the cost.

Another problem using any of the current systems is that grooves, corrugations, and the like may be left as voids within the covering, hence a weaker roof covering is obtained and one, if punctured will allow a buildup of water between the membrane and the roof substrate and/or leaking.

It is also well known that polyethylene, polypropylene and copolymers of these materials will not bond to foamed in place polyurethane, in fact, these polymer membranes are used as release films for polyurethane foams. It has been found by the present inventor that membranes comprising polymers of ethylene, propylene and/or mixtures thereof that are modified in specific ways, do adhere to polyurethane foam when foamed in place and contacted therewith during the foaming operation.

It is a specific advantage of the present laminate composition that it forms a monolithic structure, which can be prepared in place, for example, on a roof or a wall. A feature of the laminate compositions is that they furnish insulation to the substrate. It is a very great advantage that the laminate forms a superior moisture barrier, even if the membrane is punctured, the urethane foam is a closed cell structure (in the sense that the cell walls are substantially 100% intact). Another significant advantage of roofs completed with the present laminate compositions is the elimination of the billowing effect and wind uplift possible with some of the systems described above. These and other advantages and features will become more apparent from the following descriptions.

SUMMARY OF THE INVENTION

Briefly the present invention are laminate composition comprising a substrate, foamed polyurethane adhered to the substrate and adhered to a membrane of polymeric material consisting of ethylene, propylene or copolymer thereof which has been modified and adheres to polyurethane.

The modified ethylene propylene or copolymer membranes which adhere to polyurethane when contacted by foam, prior to setting include chlorinated polyethylene, chlorosulfonated polyethylene, and ethylene propylene diene copolymer (EPDM—abbreviation for the term ethylene propylene diene monomer which is used in industry to designate this class of polymers).

The substrate may be any material used to form roof or wall enclosures, i.e., wood, metals such as steel, copper or aluminum, particle board, or the like to which the polyurethane foam will adhere. Hence, polymeric materials of the type described above may be used. In some instances, the substrate may be an old surface, such as a wood shingle, composition shingle or tar and stone roofs. The polyurethane foamed in place will readily adhere to those substrates.

DETAILED DESCRIPTION OF THE INVENTION

Figure 1:
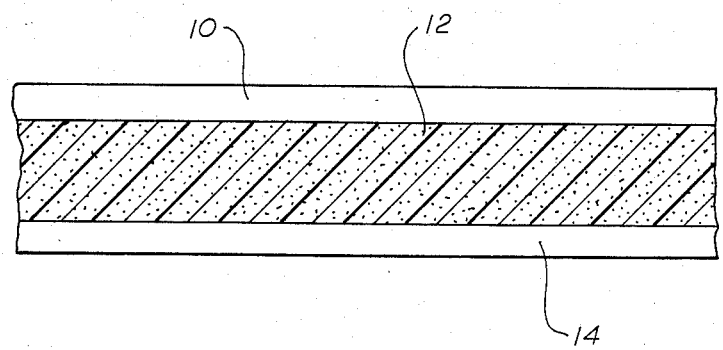
FIG. 1 is a laminate composition of a membrane, polyurethane foam and a substrate.

The modified ethylene, propylene and ethylene-propylene copolymers are well known and several are commercially available.

Chlorinated polyethylene and propylene may be produced by contacting the polymer in solution (aromatic solvents are particularly effective) with chlorine. Similar types of polymer may be obtained by polymerization of chloro substituted monomers. The amount of chlorine in the polymer would normally be from about 15% to 35%.

Chlorosulfonated polyethylene is produced by treating polyethylene in solution with chlorine and sulfur dioxide. Commercial products contain about 1.3% sulfur and 29.0% chlorine. Most of the chlorine atoms are attached directly to carbon and occur on about every seventh carbon atom along the chain. The remaining chlorine is present in the form of sulfonyl chloride groups ($-SO_2Cl$) which occur approximately every 100 carbon atoms).

The EPDM is a terpolymer, wherein ethylene and propylene are the principal monomers and a third monomer is copolymerized therewith. These polymers are produced using coordination catalysts. Several types of have been found to be effective, including 1,4-hexadiene and other diolefins with one terminal and one non-terminal double bond, bridged ring hydrocarbons such as methylene, norbornene and dicyclopentadiene, and cyclic dienes such as 1,5-cyclooctadiene. Currently commercial products contain 1,4-hexadiene or norbornene.

The membranes are usually from 20 to 50 mils thick.

Polyurethane foams are wel known and those used in the art previously for in situ foaming may be used. Polyurethanes are polyisocyanate crosslinked relatively short polyesters. The foaming is obtained by the introduction of a blowing agent into the reaction mixture before the crosslinking has completed and the polymer is set.

A variety of organic polyisocyanates can be employed in producing the foams of the invention, although aromatic di-isocyanates are generally used. Di-isocyanates include 2,4-2,6-toluene di-isocyanates and mixtures thereof; 1,4- and 1,5-naphthalene di-isocyanate; phenyl di-isocyanates such as 4,4'-di-phenylmethane, p-dixylylmethane-4,4'-tri-isocyanate; and tri-isocyanates such as 4,6,6'-tri-isocyanate.

Polyols having a molecular weight ranging from about 500 to 10,000 are used as sources of active hydrogen. These include polyesters and polyethers. The polyesters are derived from polyfunctional acids and polyols such as the adipates, succinates, sebacates, acetates and phthalates of pentaerythritol, xylitol and sorbitol. Suitable polyethers include the condensation products of propylene oxide with polyfunctional alcohols and amines such as glycerol, pentaerythritol, xylitol, sorbitol, a-methyl glucoside, and ethylenediamine.

Normally, the polyol will have a hydroxyl number of 250 to 350, however, the operator must select the particular ingredients to obtain the desired density, rigidity and the like.

It is the usual practice to use a catalyst. Compounds such as bismuth nitrate, lead 2-ethylhexoate, lead benzoate, lead oleate, sodium trichlorophenate, tetrabutyl titanate, ferric chloride, stannous octoate, stannous oleate, butyltin trichloride, and tertiary amines such as triethylene diamine, are suitable catalysts.

Conventional equipment and techniques for blending the components and distributing blended material is used to obtain the foams. Normally the blowing agent is a liquified halohydrocarbon. Usually a two component system is used with one component being a prepolymer mixture of the polyisocyanate and a portion of the polyol and the second component containing the remainder of the polyol, the blowing agent and catalyst.

The reaction once these components are mixed and applied to a substrate is rapid. In order to form the laminate compositions of the present invention the membrane must be in a position to form an enclosure with the substrate into which the polyurethane foaming mixture is introduced and in which it foams, such that the foam contacts the membrane and substrate before it is cured, thereby bonding the three components into a monolithic structure.

This is obtained by the use of the apparatus described in Lee, U.S. Pat. No. 4,093,411 issued June 6, 1978, which is incorporated herein in its entirety. Briefly that apparatus comprises a movable framework which is spaced away from the surface and which forms a movable mold relative to the surface wherein a portion of the framework which is substantially parallel with the surface is comprised of a movable continuous belt located about a pressure plate being adjacent to the surface of the belt which forms a cover for the foamed surface. The continuous belt provides a non-blocking surface, i.e., one that does not hinder the movement of the framework as the foamed material rises and presses against the belt and pressure plate, since the continuous belt is rollably mounted. A continuous sheet of the described membrane is dispensed between the continuous belt and the rising polyurethane foam material.

FIG. 1 illustrates a laminate composition comprising a membrane 10 as described, e.g., chlorinated polyethylene (CPE), chlorosulfonated polyethylene (CSPE) or EPDM, bonded to polyurethane foam 12 bonded to a substrate 14. The substrate is a substantially flat surface such as wood, concrete or copper.

Figure 2:
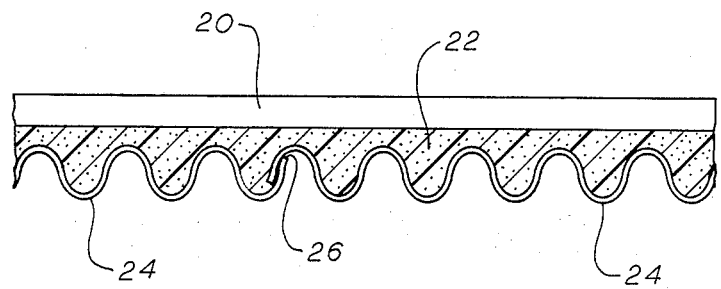
FIG. 2 is a laminate composition of a membrane, polyurethane foam and a corrugated substrate.

FIG. 2 illustrates a laminate composition wherein the substrate 24 is a corrugated material, e.g., steel bonded thereto and to the membrane 20 is polyurethane foam 22. As can be seen, the polyurethane foam fills the depressions. The polyurethane foam forms a water tight seal over the corrugated material, and over the joint or seam 26.

Figure 3:
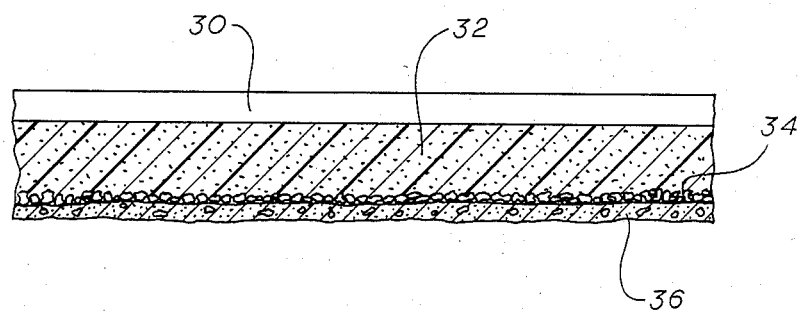
FIG. 3 is a laminate composition of a membrane, polyurethane foam and an old roof surface substrate.

FIG. 3 illustrates a laminate composition wherein the substrate is comprised of stones 34 and an asphaltic material 36, such as an old roof surface, bonded to the polyurethane foam 32 which is then bonded to the membrane 30.

The invention claimed is:

1. A laminate composition produced by the process of (a) dispensing a continuous sheet of polymeric material comprising a terpolymer of ethylene and propylene as the principal monomers and a monomer of 1,4-hexadiene, norbornene, dicyclopentadiene or 1,5-cyclooctadiene, which is spaced away from and substantially parallel to a substrate, said substrate being part of a building structure and (b) dispensing a foamable polyurethane into the enclosure formed by said substrate and said continuous polymeric material whereby said polyurethane foams to fill said enclosure, contacting and bonding to said substrate and said continuous polymeric material to form a monolithic structure.

2. The laminate composition according to claim 1 wherein said terpolymer comprises ethylene, propylene and dicyclopenadiene.

3. The laminate composition according to claim 1 wherein said terpolymer comprises ethylene, propylene and 1,5-cyclooctadiene.

4. The laminate composition according to claim 1 wherein said terpolymer comprises ethylene, propylene and norbornene.

5. The laminate composition according to claim 1 wherein said terpolymer comprises ethylene, propylene and 1,4-hexadiene.

6. The laminate composition according to claim 1 wherein said substrate is wood, steel, concrete, aluminum, particle board, copper, asphaltic material, or stone.

7. The laminate composition according to claim 1 wherein said substrate is a portion of a roof.

* * * * *